US008461254B2

(12) United States Patent
Yamamoto et al.

(10) Patent No.: US 8,461,254 B2
(45) Date of Patent: Jun. 11, 2013

(54) FLUOROSILICONES AND FLUORINE- AND SILICON-CONTAINING SURFACE TREATMENT AGENT

(75) Inventors: Ikuo Yamamoto, Osaka (JP); Shinichi Minami, Osaka (JP); Tetsuya Masutani, Osaka (JP); Peter C. Hupfield, South Glamorgan (GB); Avril E. Surgenor, South Glamorgan (GB)

(73) Assignees: Dow Corning Corporation, Midland, MI (US); Daikin Industries, Ltd., Osaka (JP)

( * ) Notice: Subject to any disclaimer, the term of this patent is extended or adjusted under 35 U.S.C. 154(b) by 98 days.

(21) Appl. No.: 13/115,572

(22) Filed: May 25, 2011

(65) Prior Publication Data

US 2011/0220833 A1    Sep. 15, 2011

Related U.S. Application Data

(62) Division of application No. 11/913,814, filed as application No. PCT/JP2006/309609 on May 8, 2006, now Pat. No. 7,973,107.

(60) Provisional application No. 60/679,150, filed on May 9, 2005, provisional application No. 60/711,335, filed on Aug. 25, 2005.

(51) Int. Cl.
*C08L 83/06* (2006.01)

(52) U.S. Cl.
USPC ........... 524/588; 428/447; 442/327; 522/152; 528/26

(58) Field of Classification Search
USPC ............. 524/588; 428/447; 528/26; 522/152; 442/327
See application file for complete search history.

(56) References Cited

U.S. PATENT DOCUMENTS

| | | | |
|---|---|---|---|
| 4,070,152 A | | 1/1978 | Pentz |
| 4,448,810 A | | 5/1984 | Westall |
| 4,770,942 A | * | 9/1988 | Itoh et al. ............... 428/447 |
| 4,987,180 A | | 1/1991 | Ohata et al. |
| 5,021,316 A | * | 6/1991 | Kubo et al. ............. 430/111.1 |
| 5,068,295 A | * | 11/1991 | Misaizu et al. ............ 526/245 |
| 5,071,725 A | * | 12/1991 | Kubo et al. ............. 430/111.1 |
| 5,128,389 A | * | 7/1992 | Inukai et al. ............. 522/172 |
| 5,247,008 A | * | 9/1993 | Michels et al. ............ 524/544 |
| 5,468,477 A | * | 11/1995 | Kumar et al. ............ 424/78.17 |
| 5,536,304 A | * | 7/1996 | Coppens et al. ............ 252/8.57 |
| 5,808,125 A | | 9/1998 | Standke et al. |
| 5,883,185 A | * | 3/1999 | Matsumura et al. ......... 524/838 |
| 6,472,019 B1 | | 10/2002 | Yamaguchi et al. |
| 6,582,620 B2 | | 6/2003 | Miyadai et al. |
| 6,641,805 B1 | | 11/2003 | Morita et al. |
| 2006/0134439 A1 | | 6/2006 | Yamamoto et al. |
| 2006/0205864 A1 | | 9/2006 | Yamamoto et al. |
| 2009/0068911 A1 | * | 3/2009 | Hupfield et al. ............ 442/327 |

FOREIGN PATENT DOCUMENTS

| | | | |
|---|---|---|---|
| EP | 0 247 489 A2 | | 12/1987 |
| EP | 247489 A2 | * | 12/1987 |
| EP | 327906 A1 | * | 8/1989 |
| EP | 0 333 083 A2 | | 9/1989 |
| EP | 0 353 709 A2 | | 2/1990 |
| EP | 0 383 310 A2 | | 8/1990 |
| EP | 0 777 009 A2 | | 6/1997 |
| EP | 0 994 134 A2 | | 4/2000 |
| EP | 994134 A2 | * | 4/2000 |
| EP | 1 217 119 A1 | | 6/2002 |
| EP | 1217119 A1 | * | 6/2002 |
| JP | 58042682 | | 3/1983 |
| JP | 60190408 | | 9/1985 |
| JP | 63-090588 | | 4/1988 |
| JP | 63-0992285 | | 4/1988 |
| JP | 63075082 | | 4/1988 |
| JP | 63101472 | | 5/1988 |
| JP | 1036674 | | 2/1989 |
| JP | 01-315471 | | 12/1989 |
| JP | 02-214791 | | 8/1990 |
| JP | 3231986 | | 10/1991 |
| JP | 05-017538 | * | 1/1993 |
| JP | 09-143877 | | 6/1997 |
| JP | 11-124419 | * | 5/1999 |
| JP | 11124419 A | | 5/1999 |
| JP | 2002-105433 | * | 4/2002 |
| JP | 2002105433 A | | 4/2002 |
| JP | 2003-154307 | * | 5/2003 |
| JP | 2003154307 A | | 5/2003 |
| JP | 2005017538 A | | 1/2005 |
| WO | 95/23830 A1 | | 9/1995 |
| WO | 2004/069935 A1 | | 8/2004 |
| WO | 2004/069955 A1 | | 8/2004 |

(Continued)

OTHER PUBLICATIONS

David Deegan, "EPA Intensifies Scientific Investigation of a Chemical Processing Aid", Environmental News, Apr. 14, 2003.
Takashige Maekawa, "Various Fluorine-Containing Surface Modifying Agents Are Disclosed", Fine Chemical, vol. 23, No. 6, 1994.
Environmental Protection Agency (EPA), "Perfluoroctanic Aid (PFOA), Fluorinated Telomers; Request for Comment, Solicitation of Interested Parties for Enforceable Consent Agreement Development, and Notice of Public Meeting", Federal Register, vol. 68, No. 73, Apr. 16, 2003.
Environmental Protection Agency (EPA), "PFOA Q's & A's", EPA Oppt Fact Sheet, Apr. 14, 2003.
U.S. Environmental Protection Agency Office of Pollution Prevention and Toxics Risk Assessment Division, "Preliminary Risk Assessment of the Development Toxicity Associated With Exposure to Perfluoroctanoic Acit and its Salts", pp. 1-61, Apr. 10, 2003.
International Search Report dated Jul. 20, 2006 pertaining to International application No. PCT/JP2006/309609.

(Continued)

*Primary Examiner* — Peter D. Mulcahy
*Assistant Examiner* — Henry Hu
(74) *Attorney, Agent, or Firm* — Dinsmore & Shohl LLP

(57) ABSTRACT

A fluorosilicone reaction product of a mercapto functional organopolysiloxane and a fluorine-containing monomer, and methods of preparing the fluorosilicone are disclosed. The fluorosilicone products are suitable for application to substrates such as textiles, particularly fabrics, to impart oil repellent properties to the textile. The fluorosilicone reaction product is prepared from (A) a fluorine-containing monomer of the formula $CH_2=C(X)COOYRf$, and (B) a mercapto functional organopolysiloxane.

21 Claims, No Drawings

FOREIGN PATENT DOCUMENTS

| | | |
|---|---|---|
| WO | 2004/096939 A1 | 11/2004 |
| WO | 2004/108855 A1 | 12/2004 |
| WO | 2006/121171 A1 | 11/2006 |
| WO | WO-2006/121171 A1 * | 11/2006 |
| WO | WO-2010/030041 A1 * | 3/2010 |

* cited by examiner

FLUOROSILICONES AND FLUORINE- AND SILICON-CONTAINING SURFACE TREATMENT AGENT

CROSS REFERENCE TO RELATED APPLICATIONS

This application is a division of U.S. patent application Ser. No. 11/913,814, filed Nov. 7, 2007, which is the national stage of International PCT/JP2006/309609 filed May 8, 2006, which claims the benefit of U.S. Provisional Application Nos. 60/679,150 filed May 9, 2005 and 60/711,335 filed Aug. 25, 2005, the disclosures of which are incorporated herein by reference.

TECHNICAL FIELD

This invention relates to a fluorosilicone reaction product of a mercapto functional organopolysiloxane and a fluorine-containing monomer, and methods of preparing the fluorosilicone. The fluorosilicone products are suitable for application to substrates such as textiles, particularly fabrics, to impart oil repellent properties (oleophobicity) to the textile.

The fluorosilicone reaction product (that is, a fluorine- and silicon-containing polymer) is useful for a surface treatment agent imparting excellent water repellency, oil repellency, soil resistance, and feeling to a substrate such as a textile.

BACKGROUND ARTS

Fluorocarbon polymers are extensively used in the textile industry to impart oleophobicity/oil repellency to a fabric. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

U.S. Pat. No. 5,068,295 describes a water and oil repellent comprising a copolymer of a perfluoroalkyl acrylate or methacrylate, a polyorganosiloxane containing a vinyl group and a vinyl monomer containing an isocyanate or blocked isocyanate group.

U.S. Pat. No. 6,582,620 and U.S. Pat. No. 5,883,185 describe a treating composition for textiles to render them water and oil repellent obtained by cohydrolysis and condensation of (A) a fluorinated alkyl-bearing alkoxysilane, (B) an amino-bearing alkoxysilane, and (C) an alkoxysilyl-bearing polyorganosiloxane.

U.S. Pat. No. 5,536,304 describes application of a blend of a succinic anhydride-terminated polydimethylsiloxane and a poly(fluoroalkyl methacrylate) to cotton to give a fabric with oil repellency.

U.S. Pat. No. 6,472,019 describes treating a textile with a water- and oil-repellent agent comprising a fluorine-containing polymer and a sulphated fatty acid compound and WO 2004/069935 and WO 2004/069955 describe a fluorine containing polymer delivered as an aqueous dispersion for textile treatment.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric.

Hitherto, in order to give both water- and oil-repellency and softness to a substrate such as a textile, a water- and oil-repellent composition comprising a perfluoroalkyl group giving water- and oil-repellency and a silicone compound giving softness has been widely used. Please see, for example, JP-A-58-42682, JP-A-60-190408, JP-A-63-075082, JP-A-09-143877, and U.S. Pat. No. 4,070,152.

There is, for example, a method of using a copolymer of a fluorine-containing acrylate monomer and a silicone acrylate monomer for the same purpose (for example, JP-A-02-214791 and JP-A-03-231986). This method, however, has the problem that the water- and oil-repellency is decreased.

By the way, the fluoroacrylate polymer used as the conventional surface treatment agent needs at least 8 carbon atoms in the fluoroalkyl group so as to give sufficient water- and oil-repellency. Since said fluoroacrylate polymer has high hydrophobicity, in the case of emulsion polymerization, there are necessity that the amount of the used emulsifier is large, the problem that the type of the emulsifier is limited, and the necessity that an aid solvent should be used due to poor compatibility with another fluorine-free monomer. In the case of a solution polymerization, there is the problem that the solubility into a polymerization solvent is decreased for the same reason.

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation.

On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a fluorinated "telomer" may metabolize or decompose to PFOA. It is also announced that the telomer is used in a large number of commercial products including fire fighting foams, care products and cleaning products as well as soil, stain and grease resistant coating on carpets, textiles, paper, and leather.

Various recent research results indicate that in view of the practical treatment of fibers with the surface treatment agent (particularly the water- and oil-repellent agent), the important surface property is not a static contact angle, but is a dynamic contact angle, particularly a reversing contact angle. That is, the advancing contact angle of water is not dependent on the carbon number of the fluoroalkyl side chain, but the reversing contact angle of water in the case of carbon number of at most 7 is remarkably low than that in the case of carbon number of at least 8. In correspondence to this, an X ray analysis shows that the side chain crystallizes when the carbon number of side chain is at least 7. It is known that the actual water repellency has relationship with the crystallization of the side chain and that mobility of the surface treatment agent molecules is an important factor for expression of the actual performances (for example, MAEKAWA takashige, FINE CHEMICAL, Vol. 23, No. 6, page 12 (1994)). Accordingly, it is believed that the acrylate polymer having low carbon number of fluoroalkyl group in the side chain which is at most 7 (particularly at most 6) has low crystallinity so that the polymer cannot satisfy the actual performances (particularly water repellency).

Hitherto, it is know that the fluorine-containing acrylate polymer having an alpha position substituted with fluorine, chlorine or the like has good adhesion to a substrate, forms a film having a large strength, and imparts good water- and oil-repellency (JP-A-63-90588, JP-A-63-99285 and JP-A-01-315471). These publications also show that the carbon number of the fluoroalkyl group used in working examples is at least 8, and these publications do not think the use of the acrylate monomer having fluoroalkyl group having at most 6 carbon atoms.

It is proposed to use the fluorine-containing acrylate polymer which has the fluoroalkyl group having at most 4 carbon atoms and in which the alpha position is substituted with fluorine, chlorine or the like (for example, WO2004-096939). Since the polymer film, however, is strong, the feeling of the treated textile is problematically deteriorated.

A method of adding a silicone polymer or copolymerizing a silicon-containing monomer is proposed for the fluoroalkyl alkyl group having at most 4 carbon atoms to give both good water- and oil-repellency and feeling (for example, WO2004-108855). The increase of the silicone polymer content, however, problematically decreases the water- and oil-repellency.

PROBLEMS TO BE SOLVED BY THE INVENTION

An object of the present invention is to provide a water-and oil-repellent agent comprising a fluorine-containing acrylate polymer which imparts excellent water- and oil-repellency and soil resistance to a substrate, when the substrate is treated with the water- and oil-repellent agent.

SUMMARY OF THE INVENTION

The present inventors discovered that the above-mentioned object can be achieved by a polymer which is formed from a monomer comprising a fluorine-containing monomer and which is polymerized in the presence of a mercapto functional organopolysiloxane.

The present invention provides a fluorine-containing polymer comprising repeating units derived from a monomer comprising a fluorine-containing monomer, wherein the fluorine-containing polymer has a silicone moiety possessed by a mercapto functional organopolysiloxane.

The present invention also provides a method of producing a fluorine-containing polymer comprising repeating units derived from a monomer comprising a fluorine-containing monomer, wherein the method comprises polymerizing the monomer in the presence of a mercapto functional organopolysiloxane to give the fluorine-containing polymer.

This invention provides a fluorine-containing polymer comprising repeating units derived from:
(A) a monomer which comprises;
  (a) a fluorine-containing monomer of the formula:

$CH_2=C(X)COOYRf$, 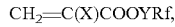

wherein X is a hydrogen atom, a monovalent organic group, or a halogen atom,
  Y is a direct bond or a divalent organic group, and
  Rf is a fluoroalkyl group having 1 to 21 carbon atoms, and
(B) a mercapto functional organopolysiloxane.

The present invention also provides a method of producing a fluorine-containing polymer comprising
polymerizing:
(A) a monomer which comprises;
  (a) a fluorine-containing monomer of the formula:

$CH_2=C(X)COOYRf$, 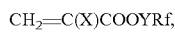

wherein X is a hydrogen atom, a monovalent organic group, or a halogen atom,
  Y is a direct bond or a divalent organic group, and
  Rf is a fluoroalkyl group having 1 to 21 carbon atoms,
in the presence of;
(B) a mercapto functional organopolysiloxane.

The fluorine-containing polymer (that is, a fluorosilicone product) of the present invention is useful to provide oil repellent properties to a variety of surfaces. When treating textiles, the fluorosilicone of the present invention may also provide a softer hand or feel than conventional fluorocarbon based oil repellent treatments.

The fluorine-containing monomer (a) is preferably a compound of the formula:

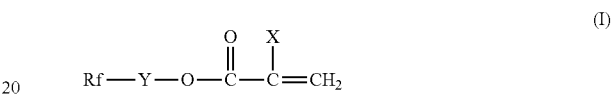

$$Rf-Y-O-\overset{O}{\underset{\|}{C}}-\overset{X}{\underset{|}{C}}=CH_2 \qquad (I)$$

wherein X is a hydrogen atom, an linear or branched alkyl group having 1 to 21 carbon atoms, a halogen atom (such as a fluorine atom, a chlorine atom, a bromine atom, a iodine atom), a $CFX^1X^2$ group (wherein $X^1$ and $X^2$ is a hydrogen atom or a halogen atom (such as a fluorine atom, a chlorine atom, a bromine atom or a iodine atom).), a cyano group, a linear or branched fluoroalkyl group having 1 to 21 carbon atoms, a substituted or unsubstituted benzyl group, or a substituted or unsubstituted phenyl group,
Y is a direct bond, an aliphatic group having 1 to 10 carbon atoms, an aromatic or cycloaliphatic group having 6 to 10 carbon atoms,
a $-CH_2CH_2N(R^1)SO_2-$ group (wherein $R^1$ is an alkyl group having 1 to 4 carbon atoms.) or
$-CH_2CH(OY^1)CH_2-$ group (wherein $Y^1$ is a hydrogen atom or an acetyl group.),
Rf is a linear or branched fluoroalkyl group having 1 to 21 carbon atoms.

EFFECTS OF THE INVENTION

According to the present invention, when a substrate is treated, the water- and oil-repellent agent comprising the fluorine-containing acrylate polymer can impart the excellent water- and oil-repellency and soil resistance to the substrate. When the substrate is a textile, the treated textile has good feeling.

MODE FOR CARRYING OUT THE INVENTION

In the present invention, the monomer (A) forming the fluorine-containing polymer comprises:
(a) a fluorine-containing monomer,
(b) optionally present, a fluorine-free monomer other than a crosslinkable monomer, and
(c) optionally present, a crosslinkable monomer.

The fluorine-containing polymer may be a homopolymer formed from one monomer or a copolymer formed from at least two monomers.

The homopolymer has the repeating units derived from the fluorine-containing monomer (a). The copolymer may has the repeating units derived from at least two fluorine-containing monomers (a), or may have, in addition to the repeating units derived from the fluorine-containing monomer (a), the repeating units derived from the fluorine-free monomer (b) and optionally the crosslinkable monomer (c).

The fluorine-containing polymer can be prepared by polymerizing the monomer (A) in the presence of the mercapto functional organopolysiloxane (B).

The fluorine-containing polymer constituting the surface treatment agent of the present invention comprises:
(a) the fluorine-containing monomer, and
optionally (b) the fluorine-free monomer other than the crosslinkable monomer, and
optionally (c) the crosslinkable monomer.
(A) Monomer
(a) Fluorine-Containing Monomer The Component (a) of the present invention is a fluorine-containing monomer of the formula:

$$CH_2=C(X)COO-Y-Rf$$

where Rf is a fluoroalkyl group having 1 to 21 carbon atoms, X is a hydrogen atom, a monovalent organic group, or a halogen atom, and
Y is a direct bond or a divalent organic group. Y may be for example a linear or branched alkylene group having 1 to 20 carbon atoms, for example a group of the formula $-(CH_2)_x-$ where x is 1 to 10, a group of the formula $-SO_2N(R^1)R^2-$ or of the formula $-CON(R^1)R^2-$, where $R^1$ is an alkyl group having 1 to 10 carbon atoms and $R^2$ is a linear or branched alkylene group having 1 to 10 carbon atoms, or a group of the formula $-CH_2CH(OR^3)CH_2-$ where $R^3$ represents a hydrogen atom or an acyl group having 1 to 10 carbon atoms such as formyl or acetyl, or a group of the formula $-Ar-CH_2-$ where Ar is an arylene group optionally having a substituent. X may be for example H, Me (methyl group), Cl, Br, I, F, CN, $CF_3$.

The fluorine-containing monomer (a) is preferably a compound of the formula:

$$Rf-Y-O-\overset{\overset{O}{\|}}{C}-\overset{\overset{X}{|}}{C}=CH_2 \quad (I)$$

wherein X is a hydrogen atom, an linear or branched alkyl group having 1 to 21 carbon atoms, a halogen atom (such as a fluorine atom, a chlorine atom, a bromine atom, a iodine atom), a $CFX^1X^2$ group (wherein $X^1$ and $X^2$ is a hydrogen atom, a fluorine atom, a chlorine atom, a bromine atom or a iodine atom.), a cyano group, a linear or branched fluoroalkyl group having 1 to 21 carbon atoms, a substituted or unsubstituted benzyl group, or a substituted or unsubstituted phenyl group,
Y is a direct bond, an aliphatic group having 1 to 10 carbon atoms, an aromatic or cycloaliphatic group having 6 to 10 carbon atoms,
a $-CH_2CH_2N(R^1)SO_2-$ group (wherein $R^1$ is an alkyl group having 1 to 4 carbon atoms.) or
$-CH_2CH(OY^1)CH_2-$ group (wherein $Y^1$ is a hydrogen atom or an acetyl group.), Rf is a linear or branched fluoroalkyl group having 1 to 21 carbon atoms.

The alpha-position of the fluorine-containing monomer may be substituted with a halogen atom or the like. Accordingly, in the formula (I), X may be an linear or branched alkyl group having 2 to 21 carbon atoms, a fluorine atom, a chlorine atom, a bromine atom, a iodine atom, a $CFX^1X^2$ group (wherein $X^1$ and $X^2$ is a hydrogen atom, a fluorine atom, a chlorine atom, a bromine atom or a iodine atom.), a cyano group, a linear or branched fluoroalkyl group having 1 to 21 carbon atoms, a substituted or unsubstituted benzyl group, or a substituted or unsubstituted phenyl group.

In the formula (I), the Rf group is preferably a perfluoroalkyl group. The carbon number of the Rf group is from 1 to 21, for example, from 1 to 6, particularly from 1 to 5, especially from 1 to 4.

Y is preferably an aliphatic group having 1 to 10 carbon atoms, an aromatic group or cycloaliphatic group having 6 to 10 carbon atoms, a $-CH_2CH_2N(R^1)SO_2-$ group ($R^1$ is an alkyl group having 1 to 4 carbon atoms.) or a $-CH_2CH(OY^1)CH_2-$ group ($Y^1$ is a hydrogen atom or an acetyl group.). The aliphatic group is preferably an alkylene group (particularly the carbon number is from 1 to 4, for example, 1 or 2.). The aromatic group and cycloaliphatic group may be substituted or unsubstituted.

The examples of the fluorine-containing monomer (a) are as follows:

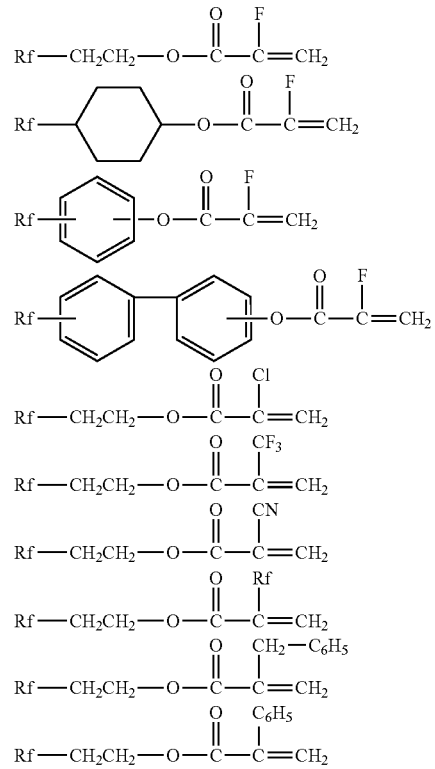

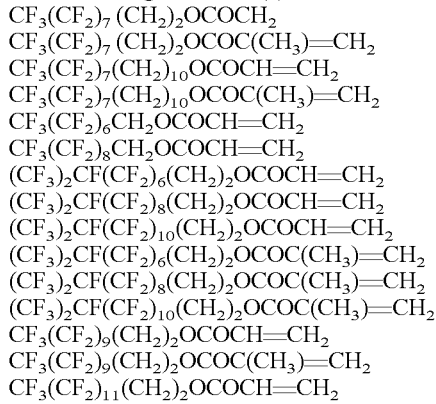

wherein Rf is a linear or branched fluoroalkyl group having, for example, 1 to 6 carbon atoms.

Other representative non-limiting examples of the fluorine-containing monomer (a) include the followings:
$CF_3(CF_2)_7(CH_2)_2OCOCH_2$
$CF_3(CF_2)_7(CH_2)_2OCOC(CH_3)=CH_2$
$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOCH=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3(CF_2)_9(CH_2)_2OCOCH=CH_2$
$CF_3(CF_2)_9(CH_2)_2OCOC(CH_3)=CH_2$
$CF_3(CF_2)_{11}(CH_2)_2OCOCH=CH_2$ $CF_3(CF_2)_{11}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$
$C_8F_{17}$—O-Ph-$CH_2OCOCH=CH_2$ (where Ph represents 1,4-phenylene)
$C_5F_{11}$—O-Ph-$CH_2OCOC(CH_3)=CH_2$
$C_8F_{17}$—O-Ph-$COOCH_2CH(OH)CH_2OCOC(CH_3)=CH_2$
$(CF_3)_2CFOCOC(CH_3)=CH_2$
$(CF_3)_2CF(CH_2)_2OCOC(CH_3)=CH_2$
$CF_3(CF_2)_7SO_2N(CH_3)(CH_2)_2OCOC(F)=CH_2$
$CF_3(CF_2)_7SO_2N(CH_3)(CH_2)_2OCOC(Cl)=CH_2$
$CF_3(CF_2)_7SO_2N(CH_3)(CH_2)_2OCOC(Br)=CH_2$
$CF_3(CF_2)_7SO_2N(CH_3)(CH_2)_2OCOC(I)=CH_2$
$CF_3(CF_2)_7SO_2N(CH_3)(CH_2)_2OCOC(CF_3)=CH_2$
$CF_3(CF_2)_7SO_2N(CH_3)(CH_2)_2OCOC(CN)=CH_2$
$CF_3(CF_2)_7SO_2N(CH_3)(CH_2)_2OCOC(C_6H_5)=CH_2$
$CF_3(CF_2)_7(CH_2)_2OCOC(F)=CH_2$
$CF_3(CF_2)_7(CH_2)_2OCOC(Cl)=CH_2$
$CF_3(CF_2)_7(CH_2)_2OCOC(Br)=CH_2$
$CF_3(CF_2)_7(CH_2)_2OCOC(I)=CH_2$
$CF_3(CF_2)_7(CH_2)_2OCOC(CF_3)=CH_2$
$CF_3(CF_2)_7(CH_2)_2OCOC(CN)=CH_2$
$CF_3(CF_2)_7(CH_2)_2OCOC(C_6H_5)=CH_2$ (b) Fluorine-Free Monomer The fluorine-containing polymer may have the repeating units derived from the fluorine-free monomer (b). The fluorine-free monomer (b) is other than the crosslinkable monomer (c). The monomer (b) is preferably a fluorine-free monomer having a carbon-carbon double bond. The monomer (b) is preferably a vinyl monomer which is free from fluorine. The fluorine-free monomer (b) is generally a compound having one carbon-carbon double bond. Preferable examples of the fluorine-free monomer (b) include, for example, ethylene, vinyl acetate, vinyl halide such as vinyl chloride, vinylidene halide such as vinylidene chloride, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, vinyl alkyl ether and isoprene. The fluorine-free monomer (b) is not limited to these examples. The fluorine-free monomer (b) may contain vinyl halide and/or vinylidene halide.

The fluorine-free monomer (b) may be a (meth)acrylate ester having an alkyl group. The number of carbon atoms of the alkyl group may be from 1 to 30, for example, from 6 to 30, e.g., from 10 to 30. For example, fluorine-free monomer (b) may be acrylates of the general formula:

$$CH_2=CA^1COOA^2$$

wherein $A^1$ is a hydrogen atom, a methyl group, or a halogen atom (for example, a chlorine atom, a bromine atom and a iodine atom) other than a fluorine atom, and $A^2$ is an alkyl group represented by $C_nH_{2n+1}$ (n=1 to 30).

(c) Crosslinkable Monomer

The fluorine-containing polymer may contain the repeating units derived from the crosslinkable monomer (c). The crosslinkable monomer (c) may be a fluorine-free vinyl monomer having at least two reactive groups and/or carbon-carbon atoms. The crosslinkable monomer (c) may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (c) include diacetoneacrylamide, (meth)acrylamide, N-methylolacrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene and glycidyl (meth)acrylate, to which the crosslinkable monomer is not limited.

The copolymerization with the monomer (b) and/or the monomer (c) can optionally improve various properties such as water repellency and soil resistance; cleaning durability and washing durability of said repellency and resistance; solubility in solvent; hardness; and feeling.

In the fluorine-containing polymer,
the amount of the fluorine-free monomer (b) may be from 0.1 to 100 parts by weight, for example, from 0.1 to 50 parts by weight, and
the amount of the crosslinkable monomer (c) may be at most 50 parts by weight, for example, at most 20 parts by weight, particularly, from 0.1 to 15 parts by weight, based on 100 parts by weight of the fluorine-containing monomer (a).

The monomer (A) can be polymerized in the presence of the mercapto organopolysiloxane (B). Examples of an olefinically unsaturated co-monomer included in the monomer (A) include alkyl acrylate or methacrylate esters having 1 to 30 carbon atoms in the alkyl group such as butyl acrylate, ethyl acrylate, methyl acrylate, methyl methacrylate or butyl methacrylate. The alkyl acrylate or methacrylate can be used to adjust the glass transition temperature (Tg) of the resulting polymeric product resulting from the reaction of the fluorine-containing monomer (A) and the amino-mercapto organopolysiloxane (B); for example an acrylate having a long chain alkyl group of 4-20, particularly 8-20 carbon atoms such as stearyl acrylate or methacrylate, octyl acrylate, 2-ethylhexyl acrylate or dodecyl acrylate or methacrylate can be used to form a softer polymer of lower Tg. Copolymers with an alkyl acrylate or methacrylate monomer may improve various properties such as water- and oil-repellency and soil releasability, cleaning durability, washing durability and abrasion resistance of such repellency and releasability, solubility in solvent, hardness and feel (handle). Other acrylate or methacrylate comonomers which can be used include polyethylene glycol acrylate or methacrylate, polypropylene glycol acrylate or methacrylate, methoxypolyethylene glycol acrylate or methacrylate and methoxypolypropylene glycol acrylate or methacrylate. Other olefinically unsaturated comonomers which can be used include vinyl chloride, vinylidene chloride, styrene, acrylonitrile, methacrylonitrile, ethylene, a vinyl alkyl ether, isoprene or a vinyl ester such as vinyl acetate or vinyl propionate. The olefinically unsaturated comonomer can be used which contains a functional group that, although not reactive with amine groups, may be reactive with other functional groups to give properties such as increased substantivity on textiles and other substrates. Examples of such functional groups are hydroxyl, amino and amide, and examples of olefinically unsaturated comonomers containing them are acrylamide, methacrylamide, N-methylolacrylamide, hydroxyethyl methacrylate, hydroxyethyl acrylate, 3-chloro-2-hydroxypropyl acrylate or methacrylate, N,N-dimethylaminoethyl acrylate or methacrylate and diethylaminoethyl acrylate or methacrylate.

(B) The Mercapto Functional Organopolysiloxane

Component (B) of the present invention is a mercapto functional organopolysiloxane, that is, an organopolysiloxane having a mercapto functional organic group present in the molecule. As used herein, a "mercapto functional organic group" is any organic group containing a sulfur atom.

Organopolysiloxanes are well known in the art and are often designated by the general formula $R_nSiO_{(4-n)/2}$, where the organopolysiloxanes may comprise any number of "M" (mono functional) siloxy units ($R_3SiO_{0.5}$), "D" (difunctional) siloxy units ($R_2SiO$), "T" (trifunctional) siloxy units ($RSiO_{1.5}$), or "Q" siloxy units ($SiO_2$) where R is independently a monovalent organic group. These siloxy units can be combined in various manners to form cyclic, linear, or branched structures. The chemical and physical properties of the resulting polymeric structures can vary. For example organopolysiloxanes can be volatile or low viscosity fluids, high viscosity fluids/gums, elastomers or rubbers, and resins. R is independently a monovalent organic group, alternatively R is a hydrocarbon group containing 1 to 30 carbons, alternatively R is an alkyl group containing 1 to 30 carbon atoms, or alternatively R is methyl.

The organopolysiloxanes useful as component (B) in the present invention are characterized by having at least one of the R groups in the formula $R_nSiO_{(4-n)/2}$ be a mercapto group, or alternatively at least one of the R groups be a mercapto group and one of the R groups be an organofunctional group, or alternatively one of the R groups be an organofunctional group also containing a mercapto group. The organofunctional group and mercapto functional group may be present on any siloxy unit having an R substituent, that is, they may be present on any M, D, or T unit. Typically, the organofunctional groups and mercapto groups are present as a R substituent on a D siloxy unit.

As used herein, "organofunctional group" means an organic group containing any number of carbon atoms, but the group contains at least one atom other than carbon and hydrogen. Representative examples of such organofunctional groups include, amines, amides, sulfonamides, quaternaries, ethers, epoxy, phenols, esters, carboxyls, ketones, halogen substituted alkyls and aryls group, to name a few. Alternatively, the organofunctional group is an amino-functional organic group.

When the organofunctional group is an amino-functional organic group, the amino-functional organic group is designated in the formulas herein as $R^N$ and is illustrated by groups having the formula: —$R^1NHR^2$, —$R^1NR_2^2$, or —$R^1NHR^1NHR^2$, wherein each $R^1$ is independently a divalent hydrocarbon group having at least 2 carbon atoms, and $R^2$ is hydrogen or an alkyl group. Each $R^1$ is typically an alkylene group having from 2 to 20 carbon atoms. $R^1$ is illustrated by groups such as; —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2$—, —$CH_2CH_2CH(CH_2CH_3)CH_2CH_2CH_2$—, —$CH_2CH_2CH_2CH_2CH_2CH_2CH_2$—, and —$CH_2CH_2CH_2CH_2CH_2CH_2CH_2CH_2$—. The alkyl groups $R^2$ are as illustrated above for R. When $R^2$ is an alkyl group, it is typically methyl.

Some examples of suitable amino-functional hydrocarbon groups are;
—$CH_2CH_2NH_2$,
—$CH_2CH_2CH_2NH_2$, —$CH_2CHCH_3NH$,
—$CH_2CH_2CH_2CH_2NH_2$,
—$CH_2CH_2CH_2CH_2CH_2NH_2$,
—$CH_2CH_2CH_2CH_2CH_2CH_2NH_2$,
—$CH_2CH_2NHCH_3$, —$CH_2CH_2CH_2NHCH_3$, —$CH_2(CH_3)CHCH_2NHCH_3$,
—$CH_2CH_2CH_2CH_2NHCH_3$, —$CH_2CH_2NHCH_2CH_2NH_2$,
—$CH_2CH_2CH_2NHCH_2CH_2NH_2$,
—$CH_2CH_2CH_2CH_2NHCH_2CH_2CH_2NH_2$,
—$CH_2CH_2NHCH_2CH_2NHCH_3$,
—$CH_2CH_2CH_2NHCH_2CH_2CH_2NHCH_3$,
—$CH_2CH_2CH_2CH_2NHCH_2CH_2CH_2NHCH_3$, and
—$CH_2CH_2NHCH_2CH_2NHCH_2CH_2CH_3$.

Typically, the amino functional group is —$CH_2CH_2CH_2NH_2$.

The mercapto-functional organic group is designated in the formulas herein as $R^S$ and is illustrated by groups having the formula: —$R^1SR^2$, wherein each $R^1$ and $R^2$ is as defined above. The mercapto-functional group is illustrated by the following formulae; $CH_2CH_2CH_2SH$, —$CH_2CHCH_3SH$, —$CH_2CH_2CH_2CH_2SH$, —$CH_2CH_2CH_2CH_2CH_2SH$, —$CH_2CH_2CH_2CH_2CH_2CH_2SH$, —$CH_2CH_2SCH_3$. Typically, the mercapto functional group is —$CH_2CH_2CH_2SH$.

In a preferable embodiment, the mercapto functional organopolysiloxane (designated B') comprises siloxy units having the average formula:

$(R_2SiO)_a(RR^NSiO)_b(RR^SSiO)_c$ where; a is 0-4000, alternatively 0 to 1000, alternatively 0 to 400,
b is 1-1000, alternatively 1 to 100, alternatively 1 to 50,
c is 1-1000, alternatively 1 to 100, alternatively 1 to 50;
R is independently a monovalent organic group,
alternatively R is a hydrocarbon containing 1-30 carbon atoms,
alternatively R is a monovalent alkyl group containing 1-12 carbons, or
alternatively R is a methyl group;
$R^N$ is a monovalent amino functional organic group as defined above,
$R^S$ is a monovalent mercapto functional organic group as defined above.

Organopolysiloxane (B') may be terminated with a hydrogen atom (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, alternatively the alkyl group can be a long chain alkyl group of 4-20, alternatively 8-20 carbon atoms such as stearyl. Alternatively the organopolysiloxane can be terminated with a trimethylsilyl group.

The organopolysiloxane (B') of this preferable embodiment can be represented by the following average formula for example;

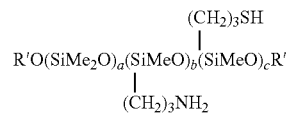

$R'O(SiMe_2O)_a(SiMeO)_b(SiMeO)_cR'$
with $(CH_2)_3SH$ and $(CH_2)_3NH_2$ substituents where; a is 0-4000, alternatively 0 to 1000, alternatively 0 to 400,
b is 1-1000, alternatively 1 to 100, alternatively 1 to 50,
c is 1-1000, alternatively 1 to 100, alternatively 1 to 50;
and R' is H, an alkyl group having 1 to 40 carbon atoms, or $Me_3Si$.

The amino-mercapto functional organopolysiloxane terpolymers of this preferable embodiment (B') can be prepared by any technique known in the art for preparation of organopolysiloxane terpolymers containing amino and/or mercapto functional groups. Typically, the organopolysiloxanes (B') are prepared via a condensation polymerization reaction of an amino functional alkoxy silane, a mercapto functional silane monomer, and organopolysiloxane having alkoxy or silanol termination as illustrated by the following general reaction scheme.

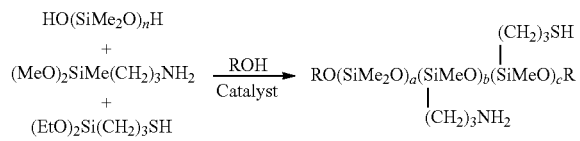

Condensation organopolysiloxanes are well known in the art and are typically catalyzed by the addition of a strong base, such as an alkaline metal hydroxide or a tin compound. Alternatively co-polymerization of the functionalized cyclosiloxanes could be used.

The fluorine-containing polymer may have a weight-average molecular weight of 2,000 to 5,000,000, particularly 3,000 to 5,000,000, especially 10,000 to 1,000,000. The weight-average molecular weight (in terms of polystyrene) of the fluorine-containing polymer can be determined by GPC (Gel Permeation Chromatography).

The fluorine-containing polymer can be produced by any polymerization method. The polymerization method includes, for example, solution polymerization and emulsion polymerization.

In the solution polymerization, there can be used a method of dissolving the monomer(s) into an organic solvent in the presence of a polymerization initiator, replacing the atmosphere by nitrogen, and stirring the mixture with heating, for example, at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of the monomers.

The organic solvent is inert to the monomer and dissolves the monomer, and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In the emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is desirable that the monomers are atomized in water by using an emulsifying device capable of applying a strong shattering energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer are methyl methacrylate, glycidyl methacrylate, 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The fluorosilicone reaction product of the fluorine-containing monomer (A) and the mercapto organopolysiloxane (B) may be prepared by any reaction process known in the art to effect polymerisation of such monomers. Preferably, the fluorosilicone may be prepared according to the process of the present invention comprising;

I) reacting, (A) a monomer comprising a fluorine-containing monomer of the formula:

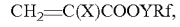

X is a hydrogen atom, a monovalent organic group, or a halogen atom,

Y is a direct bond or a divalent organic group having 1 to 20 carbon atoms, and

Rf is a fluoroalkyl group having 1 to 21 carbon atoms, in the presence of (B) a mercapto functional organopolysiloxane, via a polymerization reaction, preferably a free radical polymerisation reaction.

Components (A) and (B) in the process are the same as described above.

The process may also be conducted in the presence of a polar organic solvent. The polar organic solvent can be one or more alcohol, ketone or ester solvents selected from butanol, t-butanol, isopropanol, butoxyethanol, methyl isobutyl ketone, methyl ethyl ketone, butyl acetate or ethyl acetate and/or an aromatic hydrocarbon such as xylene, toluene or trimethylbenzene a blend of one or more of these.

The initiator for the free radical polymerisation reaction can be any compound known in the art for initiating free radical reactions, such as organic peroxides or azo compounds. Representative, non-limiting examples are; azo compounds such as azobisisobutyronitrile or azobisisovaleronitrile (AIVN), peroxides such as benzoyl peroxide. The polymerisation temperature typically ranges 50-120° C.

Alternatively the polymeric reaction product can be obtained using the technique of emulsion polymerisation, where all the components are polymerised in the presence of water, surfactants and polymerisation initiator.

The fluorosilicone reaction product can contain various ratios of the fluorine-containing monomer (A) and the mercapto organopolysiloxane (B), as controlled by the amount of each components (A) and (B). The fluorosilicone may contain 5 to 99.9% by weight, preferably 10 to 95 by weight of the monomer (A), and 0.1 to 95% by weight, preferably 5 to 90 by weight of the mercapto organopolysiloxane (B) with the proviso that sum of the wt % of (A) and (B) equals 100%. A fluorosilicone product having a high proportion of mercapto organopolysiloxane may provide greater substantivity to fibrous substrates or softness of handle of the treated material. A polymeric product having a high proportion of fluorine-containing monomer may provide maximum hydrophobicity and oleophobicity.

The fluorosilicone reaction product is generally obtained as a solution. It can be isolated by evaporation of the solvent. For application as an oil repellent, the fluorosilicone reaction product is generally required in liquid form and the solution obtained by reaction can often be diluted to a solution suitable for application to textiles. Alternatively the fluorosilicone reaction product can be dissolved in a different solvent for application to textiles, for example in a polar organic solvent of higher boiling point. The fluorosilicone reaction product can alternatively be emulsified by mixing with water and an emulsifying agent, such as a cationic surfactant and/or a nonionic or anionic surfactant. The fluorosilicone reaction product can be isolated before emulsification or the polymerisation product solution can be emulsified, optionally with removal of solvent. If the polymeric product is obtained by emulsion polymerisation, the emulsion is generally used, diluted as required, without isolating the polymeric product.

The solution or emulsion of fluorosilicone reaction product can be applied to fibrous substrates such as textiles by any of the methods known for treatment of textiles with liquids. The concentration of the fluorosilicone reaction product in the solution applied to the textile can for example be 0.5 to 20% by weight, alternatively 1 to 5%. When the textile is a fabric, the fabric can be immersed in the solution or can be padded or sprayed with the solution. The treated textile is dried and is preferably heated, for example at 100-200° C., to develop the oil repellency.

Alternatively, the fluorosilicone reaction product can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The process of the invention generally also renders the textile hydrophobic and water repellent. Fabric treatment with the polymeric product of the invention imparts oil repellency to fabrics whilst at the same time imparting an improvement in feel compared to untreated fabric and also imparting an improvement in feel compared to fabric treated with known fluoropolymer textile treatment agents.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The surface treatment agent of the present invention is preferably in the form of a solution, an emulsion or an aerosol. The surface treatment agent generally comprises the fluorine-containing polymer and a medium (particularly a liquid medium, for example, an organic solvent and/or water). The concentration of the fluorine-containing polymer in the surface treatment agent may be, for example, from 0.1 to 50% by weight.

The surface treatment agent can be applied to a substrate to be treated by a know procedure. The application of the surface treatment agent can be conducted by immersion, spraying and coating. Usually, the surface treatment agent is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the surface treatment agent. The concentration of the fluorine-containing compound in the treatment liquid contacted with the substrate may be from 0.01 to 10% by weight (particularly for immersion coating), for example, from 0.05 to 10% by weight (particularly for spray coating), based on the treatment liquid.

The substrate to be treated with the surface treatment agent (for example, a water- and oil-repellent agent) of the present invention is preferably a textile. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers.

The textile may be in any form such as a fiber, a yarn and a fabric.

The term "treatment" means that the treatment agent is applied to the substrate by immersion, spray, coating or the like. The fluorine-containing polymer which is an active component of the treatment agent can penetrate the internal of the substrate or can adhere on the surface of the substrate by the treatment.

EXAMPLES

The following Preparative Examples and Examples further illustrate the present invention in detail but are not to be construed to limit the scope thereof. All parts and percentages in the examples are on a weight basis and all measurements were obtained at about 23° C., unless indicated to the contrary.

1. Shower Water Repellency Test (JIS-L-1092)

Shower water repellency test was conducted according to JIS-L-1092. The shower water repellency was expressed by water repellency No. (as shown in the below-described Table 1).

A glass funnel which has a volume of at least 250 ml and a spray nozzle which can spray 250 ml of water for 20-30 seconds are used. A test piece flame is a metal flame having a diameter of 15 cm. Three sheets of a test piece having a size of about 20 cm×20 cm are prepared and the sheet is mounted on a test piece holding flame so that the sheet has no wrinkle. The center of the spray was located on the center of the sheet. Room temperature water (250 mL) is charged into the glass funnel and sprayed on the test piece sheet (for time of 25-30 seconds). The holding flame is removed from a stand, one edge of the holding flame is grasped so that a front surface is downside and the other edge is lightly hit with a stiff substance. The holding flame is further rotated 180° and the same procedure is repeated to drop excess water droplets. The wet test piece is compared with a wet comparison standard to grade 0, 50, 70, 80, 90 and 100 points in order of poor water-repellency to excellent water repellency. The results are obtained from an average of thee measurements.

TABLE 1

| Water repellency No. | State |
| --- | --- |
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

2. Water-Repellency Test (According to AATCC Test Method 118-1992)

A treated fabric is stored in a thermo-hygrostat having a temperature of 21° C. and a humidity of 65% for at least 4 hours. A test liquid (isopropyl alcohol (IPA), water, and a mixture thereof, as shown in Table 2) which has been also stored at 21° C. is used. The test is conducted in an air-conditioned room having a temperature of 21° C. and a humidity of 65%. Five droplets of the test liquid wherein one droplet has an amount of 50 μL, are softly dropped by a micropipette on the fabric. If 4 or 5 droplets remain on the fabric after standing for 30 seconds, the test liquid passes the test. The water-repellency is expressed by a point corresponding to a maximum content of isopropyl alcohol (% by volume) in the test liquid which passes the test. The water-repellency is evaluated as twelve levels which are Fail, 0, 1, 2, 3, 4, 5, 6, 7, 8, 9 and 10 in order of a bad level to an excellent level.

TABLE 2

| | Water-repellency test liquid | |
| --- | --- | --- |
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |

TABLE 2-continued

| | Water-repellency test liquid | |
| --- | --- | --- |
| | (% by volume) | |
| Point | Isopropyl alcohol | Water |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

3. Oil-Repellency Test (According to AATCC Test Method 118-1992)

A treated fabric is stored in a thermo-hygrostat having a temperature of 21° C. and a humidity of 65% for at least 4 hours. A test liquid (shown in Table 3) which has been also stored at 21° C. is used. The test is conducted in an air-conditioned room having a temperature of 21° C. and a humidity of 65%. Five droplets of the test liquid wherein one droplet has an amount of 50 μL, are softly dropped by a micropipette on the fabric. If 4 or 5 droplets remain on the fabric after standing for 30 seconds, the test liquid passes the test. The oil-repellency is expressed by a maximum point of the test liquid which passes the test. The oil-repellency is evaluated as nine levels which are Fail, 1, 2, 3, 4, 5, 6, 7 and 8 in order of a bad level to an excellent level.

TABLE 3

| | Oil-repellency test liquid | |
| --- | --- | --- |
| Point | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

4. Feeling

The feeling of a treated PET fabric is determined by hand touch according to the following criteria.
Very good: Remarkably softer than untreated fabric
Good: Same softness as or softer than untreated fabric
Poor: Harder than untreated fabric 5. Stability of Treatment Liquid The presence or absence of sedimentation of a treatment liquid prepared for treatment is observed.
Good: Absence of sedimentation
Poor: Presence of sedimentation (a) Synthesis of amino-mercapto functional siloxanes
Siloxane 1

Into a three necked round bottomed flask fitted with a condenser, overhead stirrer and thermocouple were charged a silanol terminated polydimethylsiloxane (708 g Mn~900), mercaptopropylmethyldimethoxysilane (37 g), aminopropylmethyldiethoxysilane (22 g), barium hydroxide (0.5 g) and sodium orthophosphate (0.2 g). The reaction mixture was heated to 75° C. and held at this temperature for three hours after which volatiles were removed under reduced pressure (200 mbar) at 85° C. for ninety minutes. To the crude product was then added trimethylethoxysilane (50 g) and the reaction held at 85° C. for a further three hours followed by further volatile removal at 70° C./50 mbar pressure for thirty minutes.

Siloxane 2

Into a three necked round bottomed flask fitted with a condenser, overhead stirrer and thermocouple were charged a silanol terminated polydimethylsiloxane (323 g Mn~900 and 380 g Mn~300), mercaptopropylmethyldimethoxysilane (230 g), aminopropylmethyldiethoxysilane (27 g), trimethylethoxysilane (42 g), barium hydroxide (0.62 g) and sodium orthophosphate (0.25 g). The reaction mixture was heated to 75° C. and held at this temperature for three hours after which volatile removal was carried out at 75° C. and a reduced pressure of 200 mbar for four hours.

Siloxane 3

Into a three necked round bottomed flask fitted with a condenser, overhead stirrer and thermocouple were charged a silanol terminated polydimethylsiloxane (743 g Mn~300), mercaptopropylmethyldiethoxysilane (230 g), aminopropylmethyldiethoxysilane (27 g), trimethylethoxysilane (39 g), barium hydroxide (0.62 g) and sodium orthophosphate (0.25 g). The reaction mixture was heated to 75° C. and held at this temperature for three hours after which volatile removal was carried out at 75° C. and a reduced pressure of 200 mbar for four hours.

The physical and structural properties of the aminomercaptosiloxanes are described in the table below:

| Batch | Mn | Viscosity (cts) | % N (w/w) | % SH (w/w) | % SiMe$_3$ End Groups | % OR or SiOH End Groups |
|---|---|---|---|---|---|---|
| Siloxane 1 | 11219 | 477 | 0.21 | 0.80 | 51 | 49 |
| Siloxane 2 | 4396 | 74 | 0.26 | 4.10 | 9 | 91 |
| Siloxane 3 | 4502 | 69 | 0.26 | 4.49 | 35 | 65 |

Preparative Example 1

Into a 300 cc flask, $CF_3CF_2—(CF_2CF_2)_n—CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), Siloxane 2 (2.5 g), pure water (66.1 g), tripropylene glycol (14.4 g), acetic acid (0.11 g), polyoxyalkylene (or polyoxyalkyl) ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Preparative Example 2

Into a 300 cc flask, $CF_3CF_2—(CF_2CF_2)_n—CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), Siloxane 2 (1.5 g), methyl isobutyl ketone (1.3 g), methanol (1.3 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Preparative Example 3

Into a 300 cc flask, $CF_3CF_2—(CF_2CF_2)_n—CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), Siloxane 1 (6.2 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Preparative Example 4

Into a 1 L autoclave, $CF_3CF_2—(CF_2CF_2)_n—CH_2CH_2OCOCCl=CH_2$ (n=1.0) (87.2 g), stearyl acrylate (11.3 g), N-methylol acrylamide (2.8 g), 3-chloro-2-hydroxypropyl methacrylate (0.67 g), Siloxane 3 (30.4 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g), polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Preparative Example 5

Into a 1 L autoclave, $CF_3CF_2—(CF_2CF_2)_n—CH_2CH_2OCOCCl=CH_2$ (n=1.0) (87.2 g), stearyl acrylate (11.3 g), N-methylol acrylamide (2.8 g), 3-chloro-2-hydroxypropyl methacrylate (0.67 g), Siloxane 2 (15.2 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g) and polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Preparative Example 6

Into a 1 L autoclave, $CF_3CF_2—(CF_2CF_2)_n—CH_2CH_2OCOCCl=CH_2$ (n=1.0) (87.2 g), stearyl acrylate (11.3 g), N-methylol acrylamide (2.8 g), 3-chloro-2-hydroxypropyl methacrylate (0.67 g), Siloxane 1 (38 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g) and polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Comparative Preparative Example 1

Into a 300 cc flask, $CF_3CF_2$—$(CF_2CF_2)_n$—$CH_2CH_2OCOCCl$=$CH_2$ (n=1.0) (33 g), stearyl acrylate (18 g), N-methylol acrylamide (1.1 g), 3-chloro-2-hydroxypropyl methacrylate (0.53 g), n-dodecylmercaptan (0.04 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Comparative Preparative Example 2

Into a 300 cc flask, $CF_3CF_2$—$(CF_2CF_2)_n$—$CH_2CH_2OCOCCl$=$CH_2$ (n=1.0) (33 g), stearyl acrylate (18 g), N-methylol acrylamide (1.1 g), 3-chloro-2-hydroxypropyl methacrylate (0.53 g), polydimethylsiloxane methacrylate (SILAPLANE FM0721 manufactured by Chisso Corp.) (1.51 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Comparative Preparative Example 3

Into a 300 cc flask, $CF_3CF_2$—$(CF_2CF_2)_n$—$CH_2CH_2OCOCCl$=$CH_2$ (n=1.0) (33 g), stearyl acrylate (18 g), N-methylol acrylamide (1.1 g), 3-chloro-2-hydroxypropyl methacrylate (0.53 g), polydimethylsiloxane methacrylate (SILAPLANE FM0721 manufactured by Chisso Corp.) (0.25 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Comparative Preparative Example 4

An amino-modified silicone oil (SF8417 manufactured by Dow Corning Toray Silicone Co. Ltd.) (0.23 g) was added to the aqueous dispersion (15 g) prepared in Comparative Preparative Example 1 and stirred for one hour to give an aqueous dispersion.

Comparative Preparative Example 5

Into a 300 cc flask, $CF_3CF_2$—$(CF_2CF_2)_n$—$CH_2CH_2OCOCCl$=$CH_2$ (n=1.0) (33 g), stearyl acrylate (18 g), N-methylol acrylamide (1.1 g), 3-chloro-2-hydroxypropyl methacrylate (0.53 g), mercaptosiloxane (Mn~11,000 and ~0.84% SH w/w Dow Corning Corp.) (5.31 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Comparative Preparative Example 6

Into a 300 cc flask, $CF_3CF_2$—$(CF_2CF_2)_n$—$CH_2CH_2OCOCH$=$CH_2$ (n=1.0) (R-1420 manufactured by Daikin Chemicals Sales Co., Ltd.) (33 g), stearyl acrylate (18 g), N-methylol acrylamide (1.1 g), 3-chloro-2-hydroxypropyl methacrylate (0.53 g), Siloxane 2 (2.5 g), pure water (66.1 g), tripropylene glycol (14.4 g), acetic acid (0.11 g), polyoxyalkylene ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give an aqueous dispersion of a polymer.

Comparative Preparative Example 7

Into 1 L autoclave, $CF_3CF_2$—$(CF_2CF_2)_n$—$CH_2CH_2OCOCCl$=$CH_2$ (n=1.0) (87.2 g), stearyl acrylate (11.3 g), N-methylol acrylamide (2.8 g), 3-chloro-2-hydroxypropyl methacrylate (0.67 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g) and polyoxyethylene-polyoxypropylene cetyl ether (6.4 g) were charged and emulsified by ultrasonic wave at 60° C. for 15 minutes with stirring. n-Dodecyl mercaptan (0.69 g) was added. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Comparative Preparative Example 8

Into a 1 L autoclave, $CF_3CF_2$—$(CF_2CF_2)_n$—$CH_2CH_2OCOCCl$=$CH_2$ (n=1.0) (87.2 g), stearyl acrylate (11.3 g), N-methylol acrylamide (2.8 g), 3-chloro-2-hydroxypropyl methacrylate (0.67 g), polydimethylsiloxane methacrylate (SILAPLANE FM0721 manufactured by Chisso Corp.) (30.5 g), pure water 236 g), tripropylene glycol 36.6 g), acetic acid 0.67 g), dialkyldimethyl ammonium chloride 3.0 g), sorbitan monopalmitate 2.1 g), polyoxyethylene oleyl ether (2.1 g) and polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Comparative Preparative Example 9

Into 1 L autoclave, $CF_3CF_2$—$(CF_2CF_2)_n$—$CH_2CH_2OCOCCl$=$CH_2$ (n=1.0) (87.2 g), stearyl acrylate (11.3 g), N-methylol acrylamide (2.8 g), 3-chloro-2-hydroxypropyl methacrylate (0.67 g), polydimethylsiloxane methacrylate (SILAPLANE FM0721 manufactured by Chisso Corp.) (0.64 g), pure water (236 g), tripropylene glycol (36.6 g), acetic acid (0.67 g), dialkyldimethyl ammonium chloride (3.0 g), sorbitan monopalmitate (2.1 g) and polyoxyethylene oleyl ether (2.1 g) and polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Comparative Preparative Example 10

An amino-modified silicone oil (SF8417 manufactured by Dow Corning Toray Silicone Co. Ltd.) (0.3 g) was added to the aqueous dispersion (20 g) prepared in Comparative Preparative Example 7 and stirred for one hour to give an aqueous dispersion.

Comparative Preparative Example 11

Into 1 L autoclave, $CF_3CF_2$—$(CF_2CF_2)_n$—$CH_2CH_2OCOCCl$=$CH_2$ (n=1.0) (87.2 g), stearyl acrylate (11.3 g), N-methylol acrylamide (2.8 g), 3-chloro-2-hydroxypropyl methacrylate (0.67 g), mercaptosiloxane (Mn~11,000 and ~0.84% w/w SH Dow Corning Corp.) (32.5 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g) and polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Comparative Preparative Example 12

Into 1 L autoclave, $CF_3CF_2$—$(CF_2CF_2)_n$—$CH_2CH_2OCOCH$=$CH_2$ (n=1.0) (R-1420 manufactured by Daikin Chemicals Sales Co., Ltd.) (87.2 g), stearyl acrylate (11.3 g), N-methylol acrylamide (2.8 g), 3-chloro-2-hydroxypropyl methacrylate (0.67 g), pure water (236 g), tripropylene glycol (36.6 g), acetic acid (0.67 g), dialkyldimethyl ammonium chloride (3.0 g), sorbitan monopalmitate (2.1 g), polyoxyethylene oley ether (2.1 g) and polyoxyethylene-polyoxypropylene cetyl ether (6.4 g) were charged and emulsified by ultrasonic wave at 60° C. for 15 minutes with stirring. The atmosphere of the autoclave was replaced with nitrogen, and then vinyl chloride (33 g) was injected. 2,2'-azobis(2-amidinopropane) dihydrochloride (1.12 g) was added and the reaction was conducted at 60° C. for 5 hours to give an aqueous dispersion of a polymer. Polyoxyalkylenealkyl ether (14 g) was added to this aqueous dispersion and the mixture was stirred for one hour to give an aqueous dispersion.

Example 1

The aqueous liquid (each of 1 g, 2 g and 4 g) prepared by Preparative Example 1 was diluted with pure water to prepare a test solution (200 g). One sheet of a nylon test fabric (510 mm×205 mm) was immersed in this test solution, was passed through a mangle, and treated in a pin tenter at 160° C. for 2 minutes. Then the test fabric was cut to give two halves (each of which has a size of 255 mm×205 mm). One half was used for the shower water-repellency test and the other was used for the water-repellency test and the oil repellency test. The same procedure as in the above manner was repeated for one sheet of a PET test fabric (510 mm×205 mm), one sheet of PET/cotton mixture test fabric (510 mm×205 mm) and one sheet of cotton test fabric (510 mm×205 mm). The results are shown in Table 4.

Example 2

The polymer prepared by Preparative Example 2 was processed as in Example 1 and then the shower water-repellency test, the water-repellency test and the oil repellency test were conducted. The results are shown in Table 4.

Example 3

The polymer prepared by Preparative Example 3 was processed as in Example 1 and then the shower water-repellency test, the water-repellency test and the oil repellency test were conducted. The results are shown in Table 4.

Example 4

The polymer prepared by Preparative Example 4 was processed as in Example 1 and then the shower water-repellency test, the water-repellency test and the oil repellency test were conducted. The results are shown in Table 4.

Example 5

The polymer prepared by Preparative Example 5 was processed as in Example 1 and then the shower water-repellency test, the water-repellency test and the oil repellency test were conducted. The results are shown in Table 4.

Example 6

The polymer prepared by Preparative Example 6 was processed as in Example 1 and then the shower water-repellency test, the water-repellency test and the oil repellency test were conducted. The results are shown in Table 4.

Comparative Example 1

The polymer prepared by Comparative Preparative Example 1 was processed as in Example 1 and then the shower water-repellency test, the water-repellency test and the oil repellency test were conducted. The results are shown in Table 5.

Comparative Example 2

The polymer prepared by Comparative Preparative Example 2 was processed as in Example 1 and then the shower water-repellency test, the water-repellency test and the oil repellency test were conducted. The results are shown in Table 5.

Comparative Example 3

The polymer prepared by Comparative Preparative Example 3 was processed as in Example 1 and then the shower water-repellency test, the water-repellency test and the oil repellency test were conducted. The results are shown in Table 5.

Comparative Example 4

The polymer prepared by Comparative Preparative Example 4 was processed as in Example 1 and then the shower water-repellency test, the water-repellency test and the oil repellency test were conducted. The results are shown in Table 5.

Comparative Example 5

The polymer prepared by Comparative Preparative Example 5 was processed as in Example 1 and then the shower water-repellency test, the water-repellency test and the oil repellency test were conducted. The results are shown in Table 5.

Comparative Example 6

The polymer prepared by Comparative Preparative Example 6 was processed as in Example 1 and then the shower water-repellency test, the water-repellency test and the oil repellency test were conducted. The results are shown in Table 5.

Comparative Example 7

The polymer prepared by Comparative Preparative Example 7 was processed as in Example 1 and then the shower water-repellency test, the water-repellency test and the oil repellency test were conducted. The results are shown in Table 5.

Comparative Example 8

The polymer prepared by Comparative Preparative Example 8 was processed as in Example 1 and then the shower water-repellency test, the water-repellency test and the oil repellency test were conducted. The results are shown in Table 5.

Comparative Example 9

The polymer prepared by Comparative Preparative Example 9 was processed as in Example 1 and then the shower water-repellency test, the water-repellency test and the oil repellency test were conducted. The results are shown in Table 5.

Comparative Example 10

The polymer prepared by Comparative Preparative Example 10 was processed as in Example 1 and then the shower water-repellency test, the water-repellency test and the oil repellency test were conducted. The results are shown in Table 5.

Comparative Example 11

The polymer prepared by Comparative Preparative Example 11 was processed as in Example 1 and then the shower water-repellency test, the water-repellency test and the oil repellency test were conducted. The results are shown in Table 5.

Comparative Example 12

The polymer prepared by Comparative Preparative Example 12 was processed as in Example 1 and then the shower water-repellency test, the water-repellency test and the oil repellency test were conducted. The results are shown in Table 5.

TABLE 4

| Performance evaluation | | Spray test | H2O/IPA | Oil | Spray test | H2O/IPA | Oil | Spray test | H2O/IPA | Oil |
|---|---|---|---|---|---|---|---|---|---|---|
| | | Example 1 | | | Example 2 | | | Example 3 | | |
| Nylon | 0.5% ww | 100 | 1 | 0 | 100 | 1 | 0 | 100 | 1 | 0 |
| | 1% ww | 100 | 1 | 0 | 100 | 1 | 0 | 100 | 1 | 0 |
| | 2% ww | 100 | 2 | 0 | 100 | 1 | 0 | 100 | 1 | 0 |
| PET | 0.5% ww | 100 | 2 | 1 | 100 | 2 | 1 | 100 | 2 | 0 |
| | 1% ww | 90 | 4 | 2 | 90 | 3 | 2 | 90 | 3 | 2 |
| | 2% ww | 90 | 4 | 3 | 90 | 4 | 3 | 90 | 3 | 3 |
| PET/Cotton | 0.5% ww | 100 | 2 | 1 | 90 | 1 | 0 | 90 | 1 | 0 |
| | 1% ww | 100 | 3 | 2 | 100 | 3 | 2 | 100 | 2 | 1 |
| | 2% ww | 100 | 3 | 3 | 100 | 3 | 3 | 100 | 2 | 2 |
| Cotton | 0.5% ww | 0 | 0 | 0 | 0 | 0 | 0 | 0 | 0 | 0 |
| | 1% ww | 80 | 1 | 0 | 70 | 1 | 0 | 80 | 1 | 0 |
| | 2% ww | 80 | 2 | 1 | 80 | 2 | 1 | 80 | 2 | 1 |

TABLE 4-continued

| Performance evaluation | | Spray test | H2O/IPA | Oil | Spray test | H2O/IPA | Oil | Spray test | H2O/IPA | Oil |
|---|---|---|---|---|---|---|---|---|---|---|
| Feeling | | Very Good | | | Very Good | | | Very Good | | |
| Treatment liquid stability | | Good | | | Good | | | Good | | |
| | | Example 4 | | | Example 5 | | | Example 6 | | |
| Nylon | 0.5% ww | 100 | 1 | 0 | 100 | 1 | 0 | 100 | 1 | 0 |
| | 1% ww | 100 | 2 | 0 | 100 | 2 | 0 | 100 | 2 | 0 |
| | 2% ww | 100 | 3 | 0 | 100 | 3 | 1 | 100 | 3 | 0 |
| PET | 0.5% ww | 100 | 2 | 0 | 100 | 2 | 0 | 100 | Fail | 0 |
| | 1% ww | 100 | 3 | 2 | 100 | 3 | 2 | 100 | 1 | 0 |
| | 2% ww | 100 | 4 | 5 | 100 | 4 | 4 | 100 | 2 | 0 |
| PET/Cotton | 0.5% ww | 100 | 2 | 1 | 100 | 2 | 2 | 80 | Fail | 0 |
| | 1% ww | 100 | 3 | 2 | 100 | 3 | 3 | 100 | 1 | 0 |
| | 2% ww | 100 | 3 | 4 | 100 | 3 | 4 | 100 | 1 | 0 |
| Cotton | 0.5% ww | 0 | 0 | 0 | 0 | 0 | 0 | 0 | 0 | 0 |
| | 1% ww | 80 | 1 | 0 | 80 | 1 | 0 | 0 | 0 | 0 |
| | 2% ww | 80 | 2 | 1 | 90 | 2 | 2 | 80 | 1 | 0 |
| Feeling | | Very Good | | | Very Good | | | Very Good | | |
| Treatment liquid stability | | Good | | | Good | | | Good | | |

TABLE 5

| Performance evaluation | | Spray test | H2O/IPA | Oil | Spray test | H2O/IPA | Oil | Spray test | H2O/IPA | Oil |
|---|---|---|---|---|---|---|---|---|---|---|
| | | Comparative Example 1 | | | Comparative Example 2 | | | Comparative Example 3 | | |
| Nylon | 0.5% ww | 100 | 1 | 0 | 50 | Fail | 0 | 100 | 1 | 0 |
| | 1% ww | 100 | 1 | 0 | 50 | ail | 0 | 100 | 1 | 0 |
| | 2% ww | 100 | 1 | 0 | 50 | Fail | 0 | 100 | 1 | 0 |
| PET | 0.5% ww | 100 | 2 | 0 | 0 | 0 | 0 | 90 | 2 | 1 |
| | 1% ww | 90 | 3 | 2 | 0 | 0 | 0 | 90 | 4 | 2 |
| | 2% ww | 90 | 4 | 3 | 0 | 0 | 0 | 90 | 4 | 3 |
| PET/Cotton | 0.5% ww | 90 | 1 | 0 | 0 | 0 | 0 | 100 | 2 | 1 |
| | 1% ww | 100 | 2 | 0 | 0 | 0 | 0 | 100 | 3 | 2 |
| | 2% ww | 100 | 2 | 0 | 0 | 0 | 0 | 100 | 3 | 3 |
| Cotton | 0.5% ww | 0 | 0 | 0 | 0 | 0 | 0 | 0 | 0 | 0 |
| | 1% ww | 80 | 1 | 0 | 0 | 1 | 0 | 80 | 1 | 0 |
| | 2% ww | 80 | 2 | 1 | 0 | 2 | 0 | 80 | 2 | 1 |
| Feeling | | Good | | | Very Good | | | Good | | |
| Treatment liquid stability | | Good | | | Poor | | | Good | | |
| | | Comparative Example 4 | | | Comparative Example 5 | | | Comparative Example 6 | | |
| Nylon | 0.5% ww | 90 | 1 | 0 | 100 | 1 | 0 | 50 | 1 | 0 |
| | 1% ww | 100 | 1 | 0 | 100 | 1 | 0 | 50 | 1 | 0 |
| | 2% ww | 100 | 1 | 0 | 100 | 2 | 0 | 50 | 1 | 0 |
| PET | 0.5% ww | 100 | 1 | 0 | 90 | 2 | 0 | 0 | Fail | 0 |
| | 1% ww | 80 | 2 | 1 | 90 | 2 | 0 | 0 | Fail | 0 |
| | 2% ww | 80 | 3 | 3 | 90 | 3 | 0 | 0 | Fail | 0 |
| PET/Cotton | 0.5% ww | 90 | 2 | 0 | 80 | 1 | 0 | 0 | 0 | 0 |
| | 1% ww | 100 | 2 | 1 | 100 | 2 | 0 | 0 | 1 | 0 |
| | 2% ww | 100 | 3 | 3 | 100 | 2 | 0 | 0 | Fail | 0 |
| Cotton | 0.5% ww | 0 | 0 | 0 | 0 | 0 | 0 | 0 | 0 | 0 |
| | 1% ww | 80 | 0 | 0 | 70 | 0 | 0 | 0 | 0 | 0 |
| | 2% ww | 80 | 2 | 1 | 70 | 2 | 0 | 0 | 0 | 0 |
| Feeling | | Very Good | | | Good | | | Good | | |
| Treatment liquid stability | | Poor | | | Good | | | Good | | |
| | | Comparative Example 7 | | | Comparative Example 8 | | | Comparative Example 9 | | |
| Nylon | 0.5% ww | 100 | 1 | 0 | 100 | 2 | 0 | 100 | 2 | 0 |
| | 1% ww | 100 | 2 | 0 | 100 | 2 | 0 | 100 | 3 | 0 |
| | 2% ww | 100 | 3 | 0 | 100 | 3 | 0 | 100 | 4 | 0 |
| PET | 0.5% ww | 100 | Fail | 0 | 80 | Fail | 0 | 80 | 3 | 2 |
| | 1% ww | 100 | 1 | 2 | 80 | 2 | 0 | 80 | 4 | 3 |
| | 2% ww | 100 | 2 | 4 | 90 | 4 | 0 | 70 | 4 | 4 |
| PET/Cotton | 0.5% ww | 80 | 1 | 0 | 80 | 1 | 0 | 100 | 3 | 0 |
| | 1% ww | 100 | 2 | 2 | 80 | 2 | 0 | 100 | 3 | 0 |
| | 2% ww | 100 | 3 | 4 | 90 | 3 | 1 | 100 | 3 | 1 |
| Cotton | 0.5% ww | 0 | 0 | 0 | 0 | 0 | 0 | 0 | 0 | 0 |
| | 1% ww | 0 | 0 | 0 | 70 | 0 | 0 | 70 | 1 | 0 |
| | 2% ww | 80 | Fail | 0 | 80 | 2 | 0 | 80 | 2 | 1 |

TABLE 5-continued

| Performance evaluation | Spray test | H2O/IPA | Oil | Spray test | H2O/IPA | Oil | Spray test | H2O/IPA | Oil |
|---|---|---|---|---|---|---|---|---|---|
| Feeling | Poor | | | Very Good | | | Good | | |
| Treatment liquid stability | Good | | | Good | | | Good | | |
| | Comparative Example 10 | | | Comparative Example 11 | | | Comparative Example 12 | | |
| Nylon 0.5% ww | 100 | 1 | 0 | 100 | 1 | 0 | 80 | 2 | 0 |
| 1% ww | 100 | 2 | 0 | 100 | 1 | 0 | 80 | 2 | 0 |
| 2% ww | 100 | 2 | 0 | 100 | 1 | 0 | 80 | 2 | 0 |
| PET 0.5% ww | 100 | 1 | 0 | 80 | Fail | 0 | 70 | Fail | 0 |
| 1% ww | 100 | 2 | 2 | 100 | Fail | 0 | 70 | Fail | 0 |
| 2% ww | 100 | 4 | 4 | 90 | 1 | 0 | 70 | Fail | 0 |
| PET/Cotton 0.5% ww | 80 | 2 | 0 | 80 | 1 | 0 | 50 | 1 | 0 |
| 1% ww | 100 | 3 | 2 | 80 | 1 | 0 | 50 | 1 | 0 |
| 2% ww | 100 | 3 | 4 | 80 | 1 | 0 | 50 | 2 | 0 |
| Cotton 0.5% ww | 0 | 0 | 0 | 0 | 0 | 0 | 0 | 0 | 0 |
| 1% ww | 0 | 0 | 0 | 70 | Fail | 0 | 50 | Fail | 0 |
| 2% ww | 70 | Fail | 0 | 70 | 1 | 0 | 50 | Fail | 0 |
| Feeling | Very Good | | | Good | | | Good | | |
| Treatment liquid stability | Poor | | | Good | | | Good | | |

In the following Examples, the following test methods were used.

Test Methods

The oil repellency of the treated fabrics was evaluated using AATCC test method 118-1997. The water repellency of the treated fabrics was evaluated using the spray test method, AATCC 22-1996.

Water repellency was also measured by the IPA/water test, in which various solutions water/isopropanol having ratios by volume comprised from 100/0 to 0/100 as reported in the table below.

| Solution H$_2$O/IPA (vol/vol) | Water repellency Index |
|---|---|
| 100/0 | 0 |
| 90/10 | 1 |
| 80/20 | 2 |
| 70/30 | 3 |
| 60/40 | 4 |
| 50/50 | 5 |
| 40/60 | 6 |
| 30/70 | 7 |
| 20/80 | 8 |
| 10/90 | 9 |
| 0/100 | 10 |

Four drops with a diameter of approximately 3 mm of the isopropanol/water solution are deposited on a sample of treated fabric. The behaviour of the four drops is observed for a time of 30 seconds. If three out of the four drops show no absorption or darkening of the fabric then one moves to the next solution with a higher content of isopropanol. The water repellency index/rating relates to the last test solution that did not absorb into or darken the fabric surface. The handle of the treated cotton fabrics was assessed on a scale of 1 to 10, where 1=harsh, 10=very soft Preparative Example 7

Silanol terminated polydimethylsiloxanes, [HO(SiMe$_2$O)$_{~40}$H] (95.6 g) and [HO (SiMe$_2$O)$_{~12}$H] (32.5 g) were charged to a reaction vessel followed by aminopropylmethyl dimethoxysilane (4.8 g) and mercaptopropylmethyl diethoxysilane (4.4 g). To the reaction mixture was then added barium hydroxide (0.72 g) and sodium orthophosphate (0.23 g). The reaction vessel was then heated to 80° C. and held at this temperature for three hours after which the reaction mixture was placed under reduced pressure (200 mbar) for several hours after which a linear aliphatic C13 alcohol (10.5 g) was added and the reaction maintained at 80° C. and atmospheric pressure for a further two hours to yield a siloxane terpolymer of viscosity 1,050 Cp (mPa·s). The polymer was then filtered to remove the catalyst and stored under nitrogen.

Preparative Example 8

Silanol terminated polydimethylsiloxanes, [HO(SiMe$_2$O)$_{~40}$H] (95.8 g) and [HO(SiMe$_2$O)$_{~12}$H] (32.9 g) were charged to a reaction vessel followed by aminopropylmethyl dimethoxysilane (4.2 g) and mercaptopropylmethyl diethoxysilane (4.8 g). To the reaction mixture was then added barium hydroxide (0.68 g) and sodium orthophosphate (0.23 g). The reaction vessel was then heated to 80° C. and held at this temperature for three hours after which the reaction mixture was placed under reduced pressure (200 mbar) for several hours after which a linear aliphatic C13 alcohol (10.9 g) was added and the reaction maintained at 80° C. and atmospheric pressure for a further two hours to yield a siloxane terpolymer of viscosity 2,160 Cp (mPa·s). The polymer was then filtered to remove the catalyst and stored under nitrogen.

Preparative Example 9

Silanol terminated polydimethylsiloxanes, [HO(SiMe$_2$O)$_{~40}$H] (94.3 g) and [HO (SiMe$_2$O)$_{~12}$H] (31.5 g) were charged to a reaction vessel followed by aminopropylmethyl dimethoxysilane (4.9 g) and mercaptopropylmethyl diethoxysilane (4.1 g). To the reaction mixture was then added barium hydroxide 0.70 g and sodium orthophosphate (0.26 g). The reaction vessel was then heated to 80° C. and held at this temperature for three hours after which the reaction mixture was placed under reduced pressure (200 mbar) for several hours after which a linear aliphatic C13 alcohol (10.1 g) was added and the reaction maintained at 80° C. and atmospheric pressure for a further two hours to yield a siloxane terpolymer of viscosity 4,380 Cp (mPa·s). The polymer was then filtered to remove the catalyst and stored under nitrogen.

Example 7

An amino-functional siloxane terpolymer, Preparative Example 7, (30.5 g), stearyl acrylate (10.2 g), fluoromonomer $CH_2=CHCO_2(CH_2)_2C_8F_{17}$ (60.7 g) and butyl acetate (201 g) were charged to a reaction vessel after which 1,1'-azo-biscyclohexanecarbonitrile (0.62 g) was added. The reaction mixture was then heated to 90° C. and held at this temperature for eight hours to yield a solution of a soft water and oil repellent polymer. The resulting solution was then diluted with butyl acetate to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

Example 8

An amino-functional siloxane terpolymer, Preparative Example 8, (28.7 g), stearyl acrylate (9.5 g), fluoromonomer $CH_2=CHCO_2(CH_2)_2C_8F_{17}$ (62.5 g) and butyl acetate (205 g) were charged to a reaction vessel after which 1,1'-azo-bis-cyclohexanecarbonitrile (0.58 g) was added. The reaction mixture was then heated to 90° C. and held at this temperature for eight hours to yield a solution of a soft water and oil repellent polymer. The resulting solution was then diluted with butyl acetate to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

Example 9

An amino-functional siloxane terpolymer, Preparative Example 9, (27.6 g), stearyl acrylate (11.2 g), fluoromonomer $CH_2=CHCO_2(CH_2)_2C_8F_{17}$ [FA] (59.5 g) and butyl acetate (208 g) were charged to a reaction vessel after which 1,1'-azo-bis-cyclohexanecarbonitrile (0.58 g) was added. The reaction mixture was then heated to 90° C. and held at this temperature for eight hours to yield a solution of a soft water and oil repellent polymer. The resulting solution was then diluted with butyl acetate to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

Comparative Example 13

Fluoromonomer $CH_2=CHCOO(CH_2)_2C_8F_{17}$ (60.5 g), stearyl acrylate (30.3 g), dodecanethiol (1.05 g), butyl acetate (190 g) and, 1,1'-azo-bis-cyclohexanecarbonitrile (0.61 g) were charged to a reaction vessel and heated to 90° C. and held for eight hours to yield a reference oil and water repellent fluorocarbon polymer.

The oil and water repellency and hand of the fabrics were evaluated and the results are shown in Tables I to IV below.

TABLE I

Results for oil repellency

| Sample | Cotton | Cotton/Polyester | Polyester | Nylon |
|---|---|---|---|---|
| Example 7 | 5 | 5 | 6 | 5 |
| Example 8 | 5 | 5 | 6 | 6 |
| Example 9 | 5 | 6 | 6 | 6 |
| Comparative 13 | 5 | 5 | 6 | 6 |

The results in Table I shows that the oil repellency of fabrics treated with the fluorosilicone hybrid polymeric reaction products of the invention is as good as fabrics treated with the control fluorocarbon polymer.

TABLE II

Results for water repellency spray test

| Sample | Cotton | Cotton/Polyester | Polyester | Nylon |
|---|---|---|---|---|
| Example 7 | 80 | 80 | 90 | 100 |
| Example 8 | 80 | 90 | 90 | 100 |
| Example 9 | 80 | 90 | 90 | 100 |
| Comparative 13 | 80 | 90 | 90 | 100 |

TABLE III

Results for IPA/water test

| Sample | Cotton | Cotton/Polyester | Polyester | Nylon |
|---|---|---|---|---|
| Example 7 | 8 | 9 | 9 | 9 |
| Example 8 | 8 | 9 | 9 | 9 |
| Example 9 | 8 | 9 | 9 | 9 |
| Comparative 13 | 9 | 9 | 9 | 9 |

The data in Tables II and III show that the water repellency of fabrics treated with the fluorosilicone hybrid polymeric reaction products of the invention is good as fabrics treated with the control fluorocarbon polymer.

TABLE IV

Handle Evaluation

| Sample | Handle |
|---|---|
| Example 7 | 6 |
| Example 8 | 6 |
| Example 9 | 7 |
| Comparative 13 | 2 |

The data in Table IV shows that the handle of fabrics treated with the fluorosilicone polymeric reaction product is much softer than fabrics treated with the control fluorocarbon polymer alone.

The invention claimed is:

1. A surface treatment agent for use on substrates, said surface treatment agent comprising a fluorine-containing polymer comprising repeating units derived from:
   (A) a monomer which comprises;
      (a) a fluorine-containing monomer of the formula:

$CH_2=C(X)COOYRf$, wherein X is a hydrogen atom, a monovalent organic group, or a halogen atom,
      Y is a direct bond or a divalent organic group, and
      Rf is a fluoroalkyl group having 1 to 21 carbon atoms, and
   (B) a mercapto functional organopolysiloxane; wherein said mercapto functional organopolysiloxane (B) is an amino-mercapto functional organopolysiloxane comprising siloxy units having the average formula:

$(R_2SiO)_a(RR^NSiO)_b(RR^SSiO)_c$ wherein a is 0-4000, b is 1-1000, c is 1-1000,
      R is independently a monovalent organic group,
      $R^N$ is a monovalent amino functional organic group, and
      $R^S$ is a monovalent mercapto functional organic group.

2. The surface treatment agent of claim 1 wherein the fluorine-containing monomer (a) is a compound of the formula:

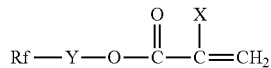   (I)

wherein X is a hydrogen atom, a linear or branched alkyl group having 1 to 21 carbon atoms, a halogen atom, a cyano group, a linear or branched fluoroalkyl group having 1 to 21 carbon atoms, a substituted or unsubstituted benzyl group, a substituted or unsubstituted phenyl group, or a $CFX^1X^2$ group,
wherein $X^1$ and $X^2$ is a hydrogen atom or a halogen atom,
Y is a direct bond,
an aliphatic group having 1 to 10 carbon atoms,
an aromatic or cycloaliphatic group having 6 to 10 carbon atoms,
a —$CH_2CH_2N(R^1)SO_2$— group,
wherein $R^1$ is an alkyl group having 1 to 4 carbon atoms, or —$CH_2CH(OY^1)CH_2$— group,
wherein $Y^1$ is a hydrogen atom or an acetyl group, and
Rf is a linear or branched fluoroalkyl group having 1 to 21 carbon atoms.

3. The surface treatment agent of claim 1 wherein the amino-mercapto functional organopolysiloxane has the average formula:

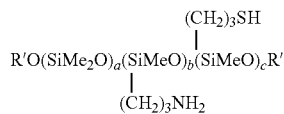

where a is 0-4000, b is 1-1000, c is 1-1000, and R' is H, an alkyl group having 1 to 40 carbon atoms, or $Me_3Si$.

4. The surface treatment agent of claim 1, wherein the monomer (A) further comprises:
(b) a fluorine-free monomer, and
(c) optionally, a crosslinkable monomer,
in addition to (a) the fluorine-containing monomer.

5. The surface treatment agent of claim 4, wherein the fluorine-free monomer (b) is an acrylate of the general formula:

$$CH_2=CA^1COOA^2$$

wherein $A^1$ is a hydrogen atom, a methyl group or a halogen atom other than a fluorine atom, and $A^2$ is a hydrocarbon group having 1 to 30 carbon atoms, particularly an alkyl group represented by $C_nH_{2n+1}$ (n=1 to 30).

6. The surface treatment agent of claim 4, wherein the crosslinkable monomer (c) is a monomer having at least two reactive groups, a monomer having at least two carbon-carbon double bonds, or a monomer having at least one carbon-carbon double bond and at least one reactive group.

7. The surface treatment agent of claim 4, wherein the crosslinkable monomer (c) is fluorine-free.

8. The surface treatment agent of claim 1 wherein X is chlorine.

9. The surface treatment agent of claim 1 comprising a liquid.

10. The surface treatment agent of claim 1 comprising:
5 to 99.9 wt % of the monomer (A) and
0.1 to 95 wt % of the mercapto functional organopolysiloxane (B); wherein the sum of (A) and (B) equals 100%.

11. A method of treating a substrate comprising:
applying a surface treatment agent to said substrate, said surface treatment agent comprising a fluorine-containing polymer comprising repeating units derived from:
(A) a monomer which comprises;
(a) a fluorine-containing monomer of the formula:

$$CH_2=C(X)COOYRf,$$

wherein X is a hydrogen atom, a monovalent organic group, or a halogen atom,
Y is a direct bond or a divalent organic group, and
Rf is a fluoroalkyl group having 1 to 21 carbon atoms, and
(B) a mercapto functional organopolysiloxane; wherein said mercapto functional organopolysiloxane (B) is an amino-mercapto functional organopolysiloxane comprising siloxy units having the average formula:

wherein a is 0-4000, b is 1-1000, c is 1-1000,
R is independently a monovalent organic group,
$R^N$ is a monovalent amino functional organic group, and
$R^S$ is a monovalent mercapto functional organic group.

12. The method of claim 11 wherein the fluorine-containing monomer (a) is a compound of the formula:

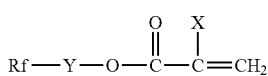   (I)

wherein X is a hydrogen atom, a linear or branched alkyl group having 1 to 21 carbon atoms, a halogen atom, a cyano group, a linear or branched fluoroalkyl group having 1 to 21 carbon atoms, a substituted or unsubstituted benzyl group, a substituted or unsubstituted phenyl group, or a $CFX^1X^2$ group,
wherein $X^1$ and $X^2$ is a hydrogen atom or a halogen atom,
Y is a direct bond,
an aliphatic group having 1 to 10 carbon atoms,
an aromatic or cycloaliphatic group having 6 to 10 carbon atoms,
a —$CH_2CH_2N(R^1)SO_2$— group,
wherein $R^1$ is an alkyl group having 1 to 4 carbon atoms, or —$CH_2CH(OY^1)CH_2$— group,
wherein $Y^1$ is a hydrogen atom or an acetyl group, and
Rf is a linear or branched fluoroalkyl group having 1 to 21 carbon atoms.

13. The method of claim 11 wherein the amino-mercapto functional organopolysiloxane has the average formula:

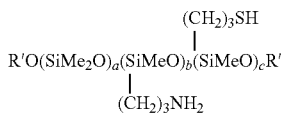

where a is 0-4000, b is 1-1000, c is 1-1000, and R' is H, an alkyl group having 1 to 40 carbon atoms, or $Me_3Si$.

14. The method of claim 11, wherein the monomer (A) further comprises:
(b) a fluorine-free monomer, and
(c) optionally, a crosslinkable monomer,
in addition to (a) the fluorine-containing monomer.

15. The method of claim 14, wherein the fluorine-free monomer (b) is an acrylate of the general formula:

$$CH_2=CA^1COOA^2$$

wherein $A^1$ is a hydrogen atom, a methyl group or a halogen atom other than a fluorine atom, and $A^2$ is a hydrocarbon group having 1 to 30 carbon atoms, particularly an alkyl group represented by $C_nH_{2n+1}$ (n=1 to 30).

16. The method of claim 14, wherein the crosslinkable monomer (c) is a monomer having at least two reactive groups, a monomer having at least two carbon-carbon double bonds, or a monomer having at least one carbon-carbon double bond and at least one reactive group.

17. The method of claim 14, wherein the crosslinkable monomer (c) is fluorine-free.

18. The method of claim 11 wherein X is chlorine.

19. The method of claim 11 wherein said surface treatment agent is applied in liquid form.

20. The method of claim 11 wherein said surface treatment agent comprises:
  5 to 99.9 wt % of the monomer (A) and
  0.1 to 95 wt % of the mercapto functional organopolysiloxane (B); wherein the sum of (A) and (B) equals 100%.

21. The method of claim 11 wherein said substrate comprises a textile.

* * * * *